Patented June 8, 1948

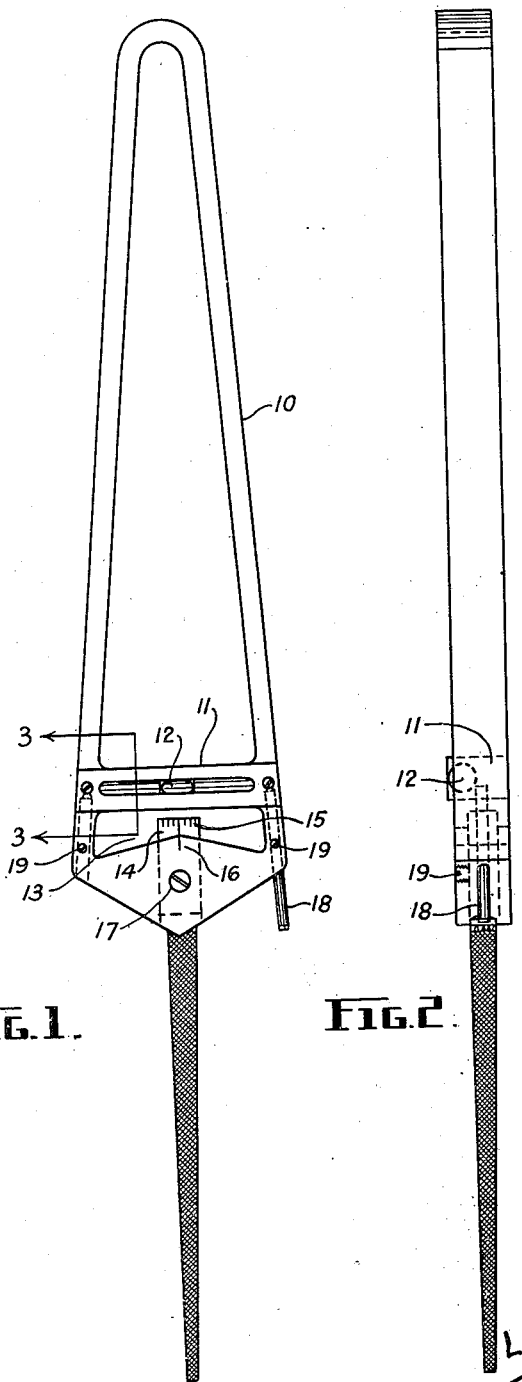

2,442,909

UNITED STATES PATENT OFFICE 2,442,909

SAW FILER

Lawrence E. Tebo, Waseca, Saskatchewan, Canada

Application August 31, 1945, Serial No. 613,856

1 Claim. (Cl. 76—36)

This invention relates to new and useful improvements in a saw filer and more particularly to hand operated file.

Its primary object is to devise and construct a simple but accurate saw filer.

A further object is that with the help of such a device all teeth of a saw may be accurately filed with the same pitch and that the hand operated filer may be sturdy of construction, reasonable in price and easy to operate.

With these and other objects in view that may appear while the description proceeds the invention consists in the novel arrangement of parts as hereinafter more specifically set forth, claimed and shown in the accompanying drawings forming part of this application and in which:

Fig. 1 is a plan view of saw filer;

Fig. 2 is a side view of same.

Referring more in detail to the drawings in which similar reference characters designate corresponding parts throughout it will be seen the invention comprises a frame handle 10, upon whose cross member 11, is affixed a slow moving spirit level 12. The handle 10, is terminated at the file end in a V form. The hollow portion 13, is to allow the file chuck 14, to protrude through the end of handle and reveal markings 15.

A setting mark 16, is grooved on the handle end and its purpose is to adjust to the file at any desired angle to suit pitch of saw to file. Holding the chuck 14, in position is set screw 17.

As shown in Figs. 1 and 2, the file chuck is inserted into the file handle and does not protrude at the front end. This is to permit the file a full stroke and to adjust itself and meet sliding pin 18. Sliding pin 18 is rubber tipped so as not to scratch or damage saws it comes in contact with. It consists of a metal tube or pin with graduation markings and is held in position by set screw 19. This gauge is used to set file at correct angle on saw teeth before commencing filing operation, and the pitch is regulated by adjusting file in chuck and setting graduations 15, accordingly. A similar gauge 18, is positioned on other side of saw handle.

Before filing operation commences it is important that the saw itself be set perfectly level in vice. Spirit level 12, is provided for that purpose. By merely placing underface of handle upon saw teeth you can adjust teeth to a perfect level. A further use of the level is also in the filing of the teeth. By using a slow moving bubble and maintaining bubble approximately in center position you will be assured of uniform teeth.

It is believed that the construction and advantages of the invention may be apparent from the foregoing paragraphs taken in conjunction with the accompanying drawings without further detailed description.

While the preferred embodiment of the invention has been disclosed it is understood that minor changes in the details of construction, combination and arrangement of cooperating parts may be resorted to within the scope of what is claimed without departing from the spirit of the invention.

I claim:

A saw filer comprising a relatively flat handle having diverging side edges and a V-shape projection at the wide end thereof, a chuck adjustably mounted in the center of said projection, a file secured in said chuck and projecting longitudinally from said handle, and gauge pins slidably mounted in the side edges of said handle, said pins being extensible longitudinally to project beyond the end of said handle for contact with the side of the saw to be filed.

LAWRENCE E. TEBO.

REFERENCES CITED

The following references are of record in the file of this patent:

UNITED STATES PATENTS

| Number | Name | Date |
|---|---|---|
| 117,677 | Pfouts | Aug. 1, 1871 |
| 686,106 | Miller | Nov. 5, 1901 |
| 740,736 | Blocher | Oct. 6, 1903 |
| 841,199 | Watson | Jan. 15, 1907 |
| 1,039,602 | Slingsby | Sept. 24, 1912 |
| 1,406,924 | Briggs | Feb. 14, 1922 |
| 1,648,426 | Sears | Nov. 8, 1927 |
| 1,833,338 | Roach | Nov. 24, 1931 |
| 2,220,169 | Murdock | Nov. 5, 1940 |